April 29, 1952     L. DE FOREST ET AL     2,594,740
ELECTRONIC LIGHT AMPLIFIER
Filed Feb. 17, 1950
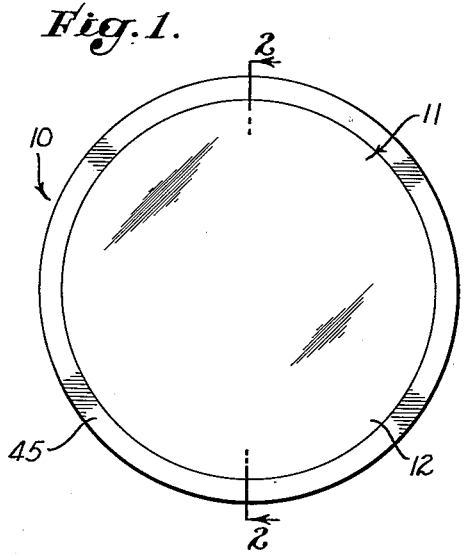
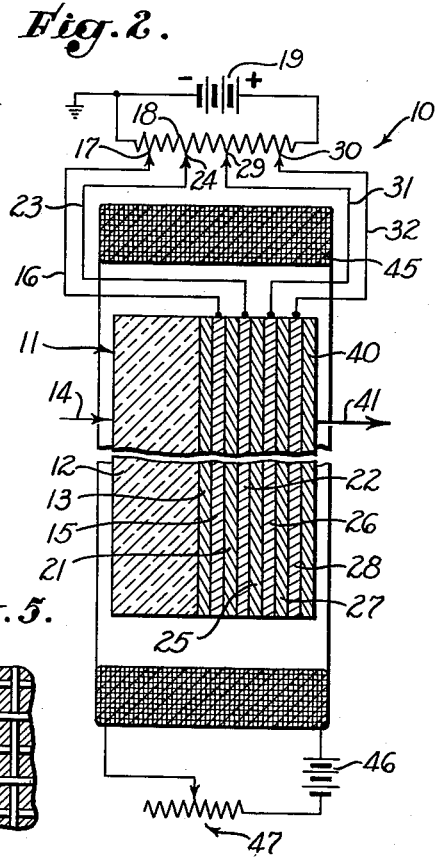
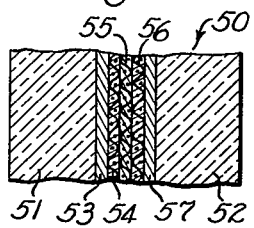
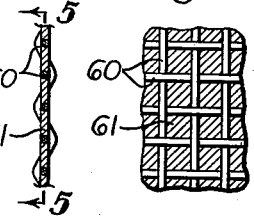
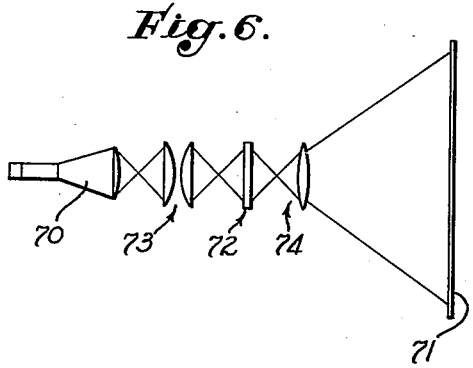
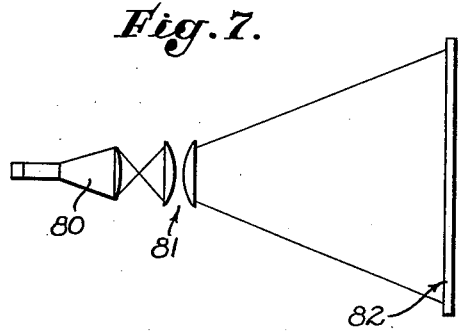
INVENTORS.
LEE DE FOREST
WILLIAM A. RHODES
BY THEIR ATTORNEYS.
HARRIS, KIECH, FOSTER & HARRIS
BY
Ward D. Foster Patented Apr. 29, 1952

2,594,740

UNITED STATES PATENT OFFICE 2,594,740

ELECTRONIC LIGHT AMPLIFIER

Lee de Forest, Los Angeles, Calif., and
William A. Rhodes, Phoenix, Ariz.

Application February 17, 1950, Serial No. 144,614

15 Claims. (Cl. 250—213)

Our invention relates to a device for increasing or amplifying the intensity of radiation and a primary object of the invention is the provision of such an amplifier. While not limited to radiation within the visible range, the invention finds particular utility in an amplifier for visible radiation and will be considered primarily in connection with visible radiation hereinafter as a matter of convenience.

An important object of the invention is to provide a light amplifier which receives a beam of light forming an image, transforms the beam of light into a beam of electrons duplicating the original image, increases the intensity of the electron beam to obtain an amplified electron beam still duplicating the original image, and which transforms the amplified electron beam into an amplified light beam duplicating the original image with increased intensity or brightness.

Expressed somewhat differently, an important object of the invention is to provide a light amplifier which receives a ray of light from an element of an image, transforms the ray of light into a ray of electrons, increases the intensity of the original ray of electrons to obtain an amplified ray of electrons, and which transforms the amplified ray of electrons into an amplified ray of light corresponding to the original ray. A related object is to provide a light amplifier of this character having means for preventing lateral spreading of the original and amplified electron rays from each element of the original image to prevent distortion in the amplified image.

More particularly, an object of the invention is to provide an amplifier for light, or other radiation, which includes a radiation-sensitive and electron-emissive element for transforming a beam or ray of radiation into a beam or ray of electrons, one or more electron-sensitive and electron-emissive elements having the characteristic of emitting more than one electron for each electron impinging thereon, for amplifying the electron beam or ray, and an electron-sensitive and radiation-emissive element for transforming the amplified electron beam or ray into an amplified radiation beam or ray.

Radiation-sensitive and electron-emissive materials which are sensitive to visible radiation in particular are customarily referred to as "photoemissive," which term will be applied to such materials hereinafter for convenience in disclosing the invention. Electron multiplying materials, i. e., electron-sensitive and electron-emissive materials having the characteristic of emitting more than one electron for each electron impinging thereon, are customarily referred to as "secondary emissive" and will be referred to as such hereinafter. Materials which are electron-sensitive and radiation-emissive, particularly with respect to visible radiation, are customarily rather loosely referred to as "fluorescent." More accurately, such electron-sensitive and radiation-emissive materials are referred to as "cathodoluminescent," denoting luminescence resulting from electron bombardment, and this term will be used hereinafter to designate such materials. Cathodoluminescent materials may be divided into two groups, viz., those which are cathodofluorescent, and those which are cathodophosphorescent. In the former, luminescence ceases almost immediately upon removal of the excitation, whereas in the latter, luminescence persists after removal of the excitation. As will become apparent, the present invention finds particular utility with respect to cathodofluorescence, but since it may in some instances have utility with respect to cathodophosphorescence as well, the generic term "cathodoluminescence" will be employed hereinafter. Authority for the foregoing terminology is "Television" by V. K. Zworykin and G. A. Morton, published in 1940 by John Wiley & Sons, Inc.

The authors of "Television," supra, discuss in detail numerous photoemissive, secondary emissive and cathodoluminescent materials, which materials are suitable for the hereinafter-discussed photoemissive, secondary emissive and cathodoluminescent elements of the light amplifier of the present invention. Consequently, it is thought unnecessary to discuss such materials herein and reference is hereby made to "Television," supra, in connection with such materials.

Reference will now be had to the accompanying drawing, which discloses various embodiments of the light amplifier of the present invention and various possible applications thereof. In the drawing:

Fig. 1 is a semidiagrammatic, elevational view of a light amplifier which embodies the invention;

Fig. 2 is a semidiagrammatic, sectional view taken along the broken line 2—2 of Fig. 1;

Fig. 3 is a fragmentary sectional view similar to Fig. 2 but illustrating another embodiment of the invention;

Fig. 4 is an enlarged, fragmentary sectional view duplicating a portion of Fig. 3;

Fig. 5 is an enlarged, fragmentary sectional view taken along the broken line 5—5 of Fig. 4;

Fig. 6 is a diagrammatic view illustrating an application of the invention to a television projection system; and, Fig. 7 is a diagrammatic view illustrating another application of the invention to a television projection system.

In its preferred embodiments, the present invention provides an amplifier cell of laminated construction which, as will be discussed in detail hereinafter, is composed of extremely thin, superimposed laminae, one advantage of this preferred construction being that it provides a direct and extremely short light-electron-light path, thereby minimizing dispersion losses and the like. Referring particularly to Figs. 1 and 2, the numeral 10 designates a light amplifier of the invention which includes such a laminated amplifier cell 11, the latter being of circular outline in the particular construction illustrated. The amplifier cell 11 includes a transparent lamina 12 which may be formed of glass, transparent plastic, or other suitable transparent material, the principal function of the transparent lamina 12 being to protect and support the remaining laminae of the amplifier cell and to provide a more rigid cell. Superimposed on the transparent lamina 12 is a lamina 13 of photoemissive material, the photoemissive lamina 13 preferably being carried by the transparent lamina, as by coating the transparent lamina with photoemissive material in any suitable manner. With this construction, a ray of light, indicated by the arrow 14, which impinges on the transparent lamina 12 is transmitted thereby and, in turn, impinges on the photoemissive lamina 13. Consequently, the light ray 14 excites the photoemissive material forming the lamina 13 to an extent proportional to the intensity of the light ray, whereupon the photoemissive lamina emits electrons in proportion to the intensity of the light ray. Such emitted electrons tend to follow a path which is an extension of the path of the light ray 14 and are further confined to such a path, as will be discussed in more detail hereinafter. Thus, it will be seen that the light ray 14 is transformed into an electron ray which is, in effect, an extension of the light ray.

In the preferred construction of the amplifier cell 11, an extremely thin, electrically conductive lamina 15 is superimposed on the photoemissive lamina 13 and is subjected to a small positive potential, as by connecting it through a conductor 16 to a point 17 on a potential divider 18 which is connected across a battery 19, or other source of potential, the negative terminal of the battery being grounded. We have discovered that, with this construction, the intensity of the electron ray emitted by the photoemissive lamina 13 is materially increased and substantially all of the emitted electrons are propelled through the conductive lamina 15 by the positive charge applied thereto, the positively-charged conductive lamina comprising an anode. As will be discussed in more detail hereinafter, various materials may be employed for the conductive lamina 15, this lamina being exemplified in Fig. 2 as comprising a thin sheet of metal, such as metallic foil. Aluminum foil may be employed, for example.

Superimposed on the conductive lamina 15 is a laminated element which includes a secondary emissive lamina 21 and an electrically conductive lamina 22, the former being disposed adjacent and in contact with the first conductive lamina 15 in the series. With this construction, the electron ray emitted by the photoemissive lamina 13 and accelerated and intensified by the positively charged conductive lamina 15 excites the secondary emissive lamina 21 to produce secondary emission from the lamina 21 proportional to the emission from the lamina 13, but multiplied. The secondary emission from the lamina 21 is accelerated and propelled through the conductive lamina 22 by positively charging the latter to a higher degree than the conductive lamina 15, as by connecting the conductive lamina 22 through a conductor 23 to a point 24 on the potential divider 18 which is at a higher positive potential than the point 17 to which the conductive lamina 15 is connected. The accelerated secondary emission from the secondary emissive lamina 21 also tends to follow a path which is an extension of the path of the light ray 14 and, as will be discussed in more detail hereinafter, is further confined to such a path. Thus, the laminated element comprising the secondary emissive lamina 21 and the positively-charged conductive lamina 22 produces an amplified electron ray which is, in effect, an extension of the light ray 14, the degree of amplification of the original electron ray emitted by the photo-emissive lamina 13 depending upon the secondary emission ratio of the secondary emissive material forming the lamina 21. As discussed in "Television" supra, the secondary emission ratio depends on a number of factors, such as the secondary emissive material employed, the positive potential to which the secondary emissive lamina 21 is subjected by the positively-charged conductive lamina 22, etc. As discussed in "Television," supra, the secondary emission ratio for a particular secondary emissive material is a maximum for a particular positive potential and the positive potential applied to the secondary emissive lamina 21 is preferably in the vicinity of that producing the maximum secondary emission ratio.

Preferably, the secondary emissive lamina 21 is formed by coating the conductive lamina 22 with a secondary emissive material in any suitable manner, as by spraying, distillation in a vacuum, or otherwise. However, the secondary emissive lamina may be formed in other ways, at least one of which will be discussed hereinafter.

If further amplification of the once-amplified electron ray emitted by the secondary emissive lamina 21 and accelerated by the conductive lamina 22 is desired, it may be amplified any desired number of times through the employment of additional laminated elements each similar to the laminated element comprising the laminae 21 and 22. In the particular construction illustrated, two such laminated elements are superimposed on the laminated element comprising the laminae 21 and 22, although any desired number of such laminated elements may be employed. The laminated element which is superimposed on the laminated element comprising the laminae 21 and 22 includes a secondary emissive lamina 25 carried by an electrically conductive lamina 26, the lamina 25 being disposed adjacent the lamina 22. The last laminated element in the series comprises a secondary emissive lamina 27 carried by an electrically conductive lamina 28, the lamina 27 being disposed adjacent and in contact with the lamina 26. The conductive laminae 26 and 28 are connected to points 29 and 30, respectively, on the potential divider 18 by conductors 31 and 32, respectively, the point 29 being more positive than the point 24 and the point 30 being more positive than the point 29 so that the positively-charged conductive laminae, or anodes, 26 and 28 serve to propel the increasingly amplified electron ray corresponding to the light ray 14 through the amplifier cell 11. Ordinarily, the potential differences between the laminae 15, 22, 26 and 28 may be of the order of magnitude of from ten to two hundred volts. The increasingly amplified electron ray tends to follow a path which is an extension of the path of the light ray 14 and, as previously mentioned, is further confined to such a path in a manner to be discussed in detail hereinafter.

It will be apparent that, as thus far described, the amplifier cell 11 increases intensity of the original electron ray corresponding to the light ray 14 many times over, the degree of amplification depending upon the secondary emission ratios of the secondary emissive laminae at the potentials applied thereto, and depending upon the number of stages of amplification, i. e., depending upon the number of secondary emissive laminae and associated conductive laminae employed. If we assume a secondary emission ratio of five, for example, for each of the secondary emissive laminae 21, 25 and 27 at the particular potentials applied thereto, it will be apparent that, with the three stages of amplification shown, the intensity of the electron ray emitted by the last secondary emissive lamina 27 in the series approaches one hundred and twenty-five times that of the original electron ray emitted by the photoemissive lamina 13. As indicated, this amplification factor of one hundred and twenty-five is merely illustrative since secondary emission ratios as high as ten or more are possible.

In order to transform the amplified electron ray emitted by the last secondary emissive lamina 27 in the series into a light ray, we superimpose on the last conductive lamina in the series, as by coating it with a cathodoluminescent material, for example, a cathodoluminescent lamina 40 which transforms the amplified electron ray into a light ray 41 aligned with the original light ray 14, but of greatly increased intensity, the ratio of the intensities of the light rays 41 and 14 depending upon the over-all amplification to which the original electron ray emitted by the photoemissive lamina 13 has been subjected. If, by way of an example, we assume an over-all amplification factor of one hundred twenty-five as in the preceding paragraph, then the brightness of the amplified light ray 41 approaches one hundred twenty-five times that of the original light ray 14. Thus, it will be seen that the amplifier cell 11 transforms the ray of light 14, or other radiation, into a ray of electrons, amplifies the ray of electrons, and transforms the amplified ray of electrons, into an amplified ray of light. If, instead of considering only rays of light and electrons, we consider beams composed of an infinite number of rays, then an image-forming beam impinging upon the amplifier cell 11 is transformed into an image-duplicating beam of electrons, which beam of electrons is amplified and then transformed into an amplified, image-duplicating beam of light of an intensity many times that of the original beam of light. Possible applications of this concept will be considered in more detail hereinafter.

In order to prevent lateral spreading of the individual electron rays emitted by the various laminae 13, 21, 25 and 27, we may encircle the amplifier cell 11 with a helical coil 45, the axis of which is parallel to the desired paths for the light-electron-light rays. The coil 45 is connected in series with a battery 46 to produce an electromagnetic field having lines of force which extend in the directions of the desired light-electron-light paths, i. e., which extend in directions generally normal to the laminae of the amplifier cell, the intensity of the electromagnetic field being variable by means of a potentiometer 47. With this construction, the electromagnetic field confines the electrons to paths normal to the laminae of the amplifier cell 11, thereby preventing lateral spreading of the electrons. As a result, distortion of the image defined by the electron beam is substantially eliminated, with the result that the image defined by the amplified light beam is an excellent reproduction of the original image, except that it is many times brighter.

Although the final lamina of the amplifier cell 11 is illustrated as being the cathodoluminescent lamina 40, it will be understood that a final transparent lamina, not shown, similar to the transparent lamina 12, may be superimposed on the cathodoluminescent lamina 40 so that the intervening laminae between the initial transparent lamina 12 and the final transparent lamina are protected thereby. If desired, the cathodoluminescent lamina 40 may be formed by coating such a final transparent lamina with a cathodoluminescent material, or by coating the final conductive lamina 28 with such material.

For convenience in illustrating the amplifier cell 11 in the drawing, the thicknesses of the various laminae thereof have been exaggerated tremendously. Actually, each of the laminae 13, 15, 21, 22, 25, 26, 27 and 28 is of the order of magnitude of from 0.0001 to 0.001 inch in thickness. The over-all thickness of the particular amplifier cell 11 illustrated is of the order of magnitude of 0.01 inch to 0.1 inch. The thinner the amplifier cell 11, the smaller is the tendency of the electron rays to spread laterally and the previously discussed means for confining the electron rays to pre-determined paths may be eliminated by making the amplifier cell sufficiently thin.

It will be understood that, in order for the photoemissive lamina 13 and the secondary emissive laminae 21, 25 and 27 to be stable electron sources, some means must be provided for replacing the electrons emitted thereby. In the particular construction illustrated, such a means is provided by the electric circuit interconnecting these laminae.

It should be pointed out that instead of charging the conductive laminae 15, 22, 26 and 28 to progressively higher positive potentials from a direct current source, we may employ a very high frequency rectified current so that a series of rectified positive pulses is applied to the conductive laminae. In television applications of the amplifier cell 11, which will be discussed in more detail hereinafter, the frequency of such rectified positive pulses is preferably sufficiently higher than the maximum video frequencies employed in television receivers so as to avoid pulsation effects in the amplified image.

It will be noted that no envelope is shown enclosing the amplifier cell 11, it being unnecessary to use such an envelope.

Referring now to Figs. 3 to 5 of the drawing, we show a laminated amplifier cell 50 which includes a transparent lamina 51 corresponding to the transparent lamina 12 of the amplifier cell 11, and which includes a transparent lamina 52. Superimposed on the transparent lamina 51 is a photoemissive lamina 53, and superimposed upon the photoemissive lamina are superimposed, laminated elements 54, 55 and 56 which will be discussed in more detail in the following paragraph. Superimposed on the laminated element 56 is a cathodolminescent lamina 57 corresponding to the cathodoluminescent lamina 40 of the amplifier cell 11, the transparent lamina 52 being superimposed upon the cathodoluminescent lamina 57.

Referring particularly to Figs. 4 and 5, the laminated element 54, which is typical of the elements 54, 55 and 56, comprises an electrically conductive lamina 60 and a secondary emissive lamina 61, the laminae 60 and 61 being substantially coextensive in the particular construction illustrated, and the secondary emissive lamina 61 being carried by the electrically conductive lamina 60. The electrically conductive lamina 60 comprises a very fine mesh metallic screen, preferably a woven wire screen having of the order of magnitude of one hundred thousand spaces per square inch. Preferably, the screen is made of wire of the order of magnitude of from 0.0001 to 0.001 inch in diameter. The secondary emissive lamina 61 is preferably formed by filling the interstices or spaces of the screen with the desired secondary emissive material to form in effect, very thin diaphragms located in the spaces of the screen and supported by the wires forming such spaces. Alternatively, of course, the secondary emissive lamina may be somewhat thicker so that the metallic screen is, in effect, embedded therein.

The amplifier cell 50 may be substituted for the amplifier cell 11 and will operate in substantially the same manner so that a further description thereof herein is thought to be unnecessary.

Fig. 6 of the drawing illustrates an application of the present invention to a television projection system which includes a typical projection tube 70 for projecting an image onto a viewing screen 71, which may be either the indirect or the direct type. Interposed between the projection tube 70 and the viewing screen 71 is a light amplifier 72 which may incorporate either the amplifier cell 11, or the amplifier cell 50, the light amplifier 72 being so positioned that its photoemissive lamina faces the projection tube 70 and so that its cathodoluminescent lamina faces the viewing screen 71. Interposed between the projection tube 70 and the light amplifier 72 is a lens system 73 for projecting an image from the tube onto the light amplifier. Similarly, interposed between the light amplifier 72 and the viewing screen 71 is a lens system 74 for projecting the amplified image produced by the light amplifier 72 onto the viewing screen 71.

Since, as hereinbefore discussed, the light amplifier 72 amplifies the intensity of the image many times over, it will be apparent that the area of the viewing screen 71 may be many times that of the tube 70, thereby providing a large image readily viewable from a distance without any diminution of brightness. By way of an example, if we employ the amplification factor of one hundred twenty-five hereinbefore employed for illustrative purposes, it will be apparent that the area of the viewing screen 71 may approach one hundred twenty-five times that of the tube 70 without sacrificing any of the brightness of the image projected by the tube.

In addition to permitting the use of a large viewing screen in a television projection system without any loss of brightness, another advantage of the present invention is that it permits the use of a relatively small cathode ray tube 70 to obtain on the viewing screen an image of the desired size. Consequently, the present invention permits material reductions in the costs of television projection tubes.

Fig. 7 of the drawing illustrates another possible application of the invention to a television projection system which includes a typical projection tube 80 which projects an image onto a lens system 81; the lens system, in turn, projecting the image onto the photoemissive lamina of an enlarged light amplifier 82 of the invention. In this projection system, the cathodoluminescent lamina of the light amplifier 82 serves as a viewing screen. The projection system illustrated in Fig. 7 has advantages similar to those discussed in the projection system of Fig. 6.

It will be understood that while we have disclosed possible applications of the present invention to television projection systems, the invention may also be employed for other purposes. For example, a light amplifier embodying the invention may be employed in a motion picture projection system, not shown, thereby permitting the use of a much smaller projection lamp without any reduction in the brightness of the image projected onto the screen. Reducing the sizes of projection lamps in such systems has obvious advantages.

Also, the light amplifier of the present invention has possible application in fluoroscopy. For fluoroscopic purposes, an amplifier cell similar to the cell 11 might be employed, except that it would be necessary to add to the cell 11 a radio-luminescent lamina, not shown, between the photoemissive lamina 13 and the X-ray image.

Although we have disclosed various exemplary embodiments of our invention and have discussed a number of possible applications thereof for purposes of illustration, it will be understood that other embodiments and applications of the invention are possible without departing from the spirit thereof.

We claim as our invention:

1. In a radiation amplifier system, the combination of: a laminated cell of contacting laminae including a lamina of radiation-sensitive and electron-emissive material, a lamina of electron-sensitive and electron-emissive material having the characteristic of emitting more than one electron for each electron impinging thereon, and a lamina of electron-sensitive and radiation-emissive material, said laminae being arranged in the order specified; and means connected to said lamina of electron-sensitive and electron-emissive material for subjecting it to a positive potential.

2. A radiation amplifier system as defined in claim 1 wherein said means includes: a lamina of electrically conductive material carrying said lamina of electron-sensitive and electron-emissive material; and a source of positive potential connected to said lamina of electrically conductive material.

3. In a radiation amplifier system, the combination of: a laminated cell of contacting laminae including a lamina of radiation-sensitive and electron-emissive material, a lamina of electron-sensitive and electron-emissive material having the characteristic of emitting more than one electron for each electron impinging thereon, and a lamina of electron-sensitive and radiation-emissive material, said laminae being arranged in the order specified; means connected to said lamina of electron-sensitive and electron-emissive material for applying to it a positive potential; and means encircling said cell for producing a magnetic field having lines of force generally normal to said laminae.

4. In a radiation amplifier, a laminated cell of contacting laminae including a lamina of radiation-sensitive and electron-emissive material, a plurality of laminae of electron-sensitive and electron-emissive material each having the characteristic of emitting more than one electron for each electron impinging thereon, and a lamina of electron-sensitive and radiation-emissive material, said laminae being arranged in the order specified.

5. A radiation amplifier system including a radiation amplifier according to claim 4 and including means connected to said laminae of electron-sensitive and electron-emissive material for applying progressively higher positive potentials to said laminae of electron-sensitive and electron-emissive material in a direction from said laminae of radiation-sensitive and electron-emissive material to said lamina of electron-sensitive and radiation-emissive material.

6. In a light amplifier system, the combination of: a laminated cell of contacting laminae including a lamina of photoemissive material, a lamina of secondary emissive material, and a lamina of cathodoluminescent material, said laminae being arranged in the order specified; and means connected to said lamina of secondary emissive material for subjecting it to a positive potential.

7. In a light amplifier system, the combination of: a laminated cell of contacting laminae including a lamina of photoemissive material, at least two laminae of secondary emissive material, and a lamina of cathodoluminescent material, arranged in the order specified; and means connected to said laminae of secondary emissive material for applying progressively higher positive potentials to said laminae of secondary emissive material in a direction from said lamina of photoemissive material to said lamina of cathodoluminescent material.

8. In a light amplifier system, the combination of: a laminated cell including a lamina of photoemissive material, at least two laminated elements each of which includes a lamina of electrically conductive material carrying a lamina of secondary emissive material, and a lamina of cathodoluminescent material, arranged in contact in the order specified; and sources of progressively higher positive potentials connected to said laminae of electrically conductive material for applying progressively higher positive potentials to said laminae of electrically conductive material in a direction from said lamina of photoemissive material to said lamina of cathodoluminescent material.

9. A light amplifier system according to claim 8 wherein said lamina of electrically conductive material of each of said laminated elements comprises a sheet of metallic foil.

10. A light amplifier system according to claim 8 wherein said lamina of electrically conductive material of each of said laminated elements comprises a metallic screen, and wherein said secondary emissive material comprising the other lamina of said laminated element is disposed in the interstices of said metallic screen, whereby said laminae of said laminated element are substantially coextensive.

11. In a light amplifier system, the combination of: a laminated cell including a lamina of transparent material, a lamina of photoemissive material, at least two laminated elements each of which includes a lamina of electrically conductive material carrying a lamina of secondary emissive material, a lamina of cathodoluminescent material, and a lamina of transparent material, arranged in contact in the order specified; and positive potential sources connected to said laminae of electrically conductive material for applying progressively higher positive potentials to said laminae of electrically conductive material in a direction from said lamina of photoemissive material to said lamina of cathodoluminescent material.

12. In a light amplifier system, the combination of: a laminated cell of contacting laminae including a lamina of photoemissive material, at least two laminated elements each of which includes a lamina of electrically conductive material carrying a lamina of secondary emissive material, and a lamina of cathodoluminescent material, arranged in the order specified; sources of progressively higher positive potentials connected to said laminae of electrically conductive material in a direction from said lamina of photoemissive material to said lamina of cathodoluminescent material; and means for limiting electron movement through said laminated cell to paths generally normal to said laminae.

13. In a light amplifier system, the combination of: a laminated cell including a lamina of photoemissive material, at least two laminated elements each of which includes a lamina of electrically conductive material carrying a lamina of secondary emissive material, and a lamina of cathodoluminescent material, arranged in contact in the order specified; sources of progressively higher positive potentials connected to said laminae of electrically conductive material in a direction from said lamina of photoemissive material to said lamina of cathodoluminescent material; and electromagnetic means, including a helical coil encircling said laminated cell and a source of electric current connected to said coil, for producing an electromagnetic field having lines of force generally normal to said laminae.

14. In a light amplifier system, the combination of: a laminated cell of contacting laminae including a lamina of photoemissive material, at least two laminae of secondary emissive material, and a lamina of cathodoluminescent material, arranged in the order specified; sources of progressively higher positive potentials connected to said laminae of secondary emissive material in a direction from said lamina of photoemissive material to said lamina of cathodoluminescent material; and electro-magnetic means for limiting electron movement through said laminated cell to paths generally normal to said laminae.

15. A viewing screen comprising the light amplifier system defined in claim 11.

LEE DE FOREST.
WILLIAM A. RHODES.

REFERENCES CITED

The following references are of record in the file of this patent:

UNITED STATES PATENTS

| Number | Name | Date |
|---|---|---|
| 2,021,907 | Zworykin | Nov. 26, 1935 |
| 2,060,977 | De Boer et al. | Nov. 17, 1936 |
| 2,120,916 | Bitner | June 14, 1938 |
| 2,196,691 | Batchelor | Apr. 9, 1940 |
| 2,305,179 | Lubszynski | Dec. 15, 1942 |
| 2,495,697 | Chilowsky | Jan. 31, 1950 |
| 2,555,423 | Sheldon | June 5, 1951 |
| 2,555,424 | Sheldon | June 5, 1951 |
| 2,563,474 | Lubszynski | Aug. 7, 1951 |

FOREIGN PATENTS

| Number | Country | Date |
|---|---|---|
| 105,451 | Australia | Oct. 11, 1938 |